(12) United States Patent
Michie, Jr. et al.

(10) Patent No.: US 7,456,244 B2
(45) Date of Patent: Nov. 25, 2008

(54) HIGH-DENSITY POLYETHYLENE COMPOSITIONS AND METHOD OF MAKING THE SAME

(75) Inventors: William J. Michie, Jr., Missouri City, TX (US); Debra R. Wilson, Missouri City, TX (US); Stephanie M. Whited, Charleston, WV (US); Michael A. Kinnan, N. Canton, OH (US)

(73) Assignee: Dow Global Technologies, Midland, MI (US)

( * ) Notice: Subject to any disclaimer, the term of this patent is extended or adjusted under 35 U.S.C. 154(b) by 165 days.

(21) Appl. No.: 11/438,754

(22) Filed: May 23, 2006

(65) Prior Publication Data

US 2007/0276110 A1 Nov. 29, 2007

(51) Int. Cl.
*C08F 210/14* (2006.01)
*C08F 210/06* (2006.01)

(52) U.S. Cl. ............... 526/348; 526/348.2; 526/348.3; 526/348.4; 526/348.5; 526/348.6; 526/348.7

(58) Field of Classification Search ............... 526/348, 526/352, 348.2, 348.3, 348.4, 348.5, 348.6, 526/348.7; 528/396
See application file for complete search history.

(56) References Cited

U.S. PATENT DOCUMENTS

| | | | |
|---|---|---|---|
| 4,192,935 A | 3/1980 | Lovell et al. | |
| 4,294,794 A | 10/1981 | Lovell et al. | |
| 4,302,565 A | 11/1981 | Goeke et al. | |
| 4,452,375 A * | 6/1984 | Marcus | 220/62.12 |
| 4,508,842 A | 4/1985 | Beran et al. | |
| 4,530,914 A | 7/1985 | Ewen et al. | |
| 4,610,974 A * | 9/1986 | Speca | 502/113 |
| 4,798,081 A | 1/1989 | Hazlitt et al. | |
| 4,871,705 A | 10/1989 | Hoel | |
| 4,937,299 A | 6/1990 | Ewen et al. | |
| 5,015,511 A | 5/1991 | Treybig et al. | |
| 5,017,714 A | 5/1991 | Welborn, Jr. | |
| 5,026,798 A | 6/1991 | Canich | |
| 5,055,438 A | 10/1991 | Canich | |
| 5,096,867 A | 3/1992 | Canich | |
| 5,106,926 A | 4/1992 | Eisinger et al. | |
| 5,120,867 A | 6/1992 | Welborn, Jr. | |
| 5,124,418 A | 6/1992 | Welborn, Jr. | |
| 5,198,401 A | 3/1993 | Turner et al. | |
| 5,210,352 A | 5/1993 | Alt et al. | |
| 5,229,478 A | 7/1993 | Floyd et al. | |
| 5,264,405 A | 11/1993 | Canich | |
| 5,272,236 A | 12/1993 | Lai et al. | |
| 5,278,119 A | 1/1994 | Turner et al. | |
| 5,278,264 A | 1/1994 | Spaleck et al. | |
| 5,278,272 A | 1/1994 | Lai et al. | |
| 5,290,745 A | 3/1994 | Jorgensen et al. | |
| 5,292,845 A | 3/1994 | Kawasaki et al. | |
| 5,304,614 A | 4/1994 | Winter et al. | |
| 5,317,036 A | 5/1994 | Brady, III et al. | |
| 5,324,800 A | 6/1994 | Welborn, Jr. et al. | |
| 5,332,793 A | 7/1994 | Cann | |
| 5,342,907 A | 8/1994 | Cann et al. | |
| 5,347,025 A | 9/1994 | Yamada et al. | |
| 5,350,723 A | 9/1994 | Neithamer et al. | |
| 5,384,299 A | 1/1995 | Turner et al. | |
| 5,391,789 A | 2/1995 | Rohrmann et al. | |
| 5,391,790 A | 2/1995 | Rohrmann et al. | |
| 5,399,636 A | 3/1995 | Alt et al. | |
| 5,408,017 A | 4/1995 | Turner et al. | |
| 5,410,003 A | 4/1995 | Bai | |
| 5,455,366 A | 10/1995 | Rohrmann et al. | |
| 5,491,207 A | 2/1996 | Hoel | |
| 5,527,752 A | 6/1996 | Reichle et al. | |
| 5,534,473 A | 7/1996 | Welch et al. | |
| 5,539,124 A | 7/1996 | Etherton et al. | |
| 5,554,775 A | 9/1996 | Krishnamurti et al. | |
| 5,621,126 A | 4/1997 | Canich et al. | |
| 5,684,098 A | 11/1997 | Wang et al. | |
| 5,693,730 A | 12/1997 | Kuber et al. | |
| 5,698,634 A | 12/1997 | Yasuda et al. | |
| 5,710,297 A | 1/1998 | Weller et al. | |
| 5,712,354 A | 1/1998 | Boncella et al. | |
| 5,714,427 A | 2/1998 | Winter et al. | |
| 5,714,555 A | 2/1998 | Chabrand et al. | |
| 5,728,641 A | 3/1998 | Aida et al. | |
| 5,728,839 A | 3/1998 | Herrmann et al. | |
| 5,753,577 A | 5/1998 | Hamura et al. | |
| 5,767,209 A | 6/1998 | McNally et al. | |

(Continued)

FOREIGN PATENT DOCUMENTS

EP 0 420 436 A1 4/1991

(Continued)

OTHER PUBLICATIONS

Williams, T. and Ward, I.M., "The Construction of a Polyethylene Calibration Curve For Gel Permeation Chromatography Using Polystyrene Fractions", Polymer Letters, 1968, pp. 621-624, vol. 6, H.H. Wills Physics Laboratory, England.

(Continued)

*Primary Examiner*—Bernard Lipman

(57) ABSTRACT

The instant invention is a high-density polyethylene composition, and method of making the same. The high-density polyethylene composition of the instant invention includes an ethylene alpha-olefin copolymer having a density in the range of 0.935 to 0.952 g/cm$^3$, a melt index ($I_2$) in the range of 30 to 75 g/10 minutes, an $I_{21}/I_2$ ratio in the range of 13-35, a $M_w/M_n$ ratio in the range of 3.5-8. The high-density polyethylene composition has a brittleness temperature of at least less than −20° C. The process for producing a high-density polyethylene composition according to instant invention includes the following steps: (1) introducing ethylene, and an alpha-olefin comonomer into a reactor; (2) copolymerizing the ethylene with the alpha-olefin comonomer in the reactor; and (3) thereby producing the high-density polyethylene composition, wherein the high-density polyethylene composition having a density in the range of 0.935 to 0.952 g/cm$^3$, a melt index ($I_2$) in the range of 30 to 75 g/10 minutes, an $I_{21}/I_2$ ratio in the range of 13-35, a $M_w$/Mn ratio in the range of 3.5-8, and a brittleness temperature of at least less than −20° C.

11 Claims, No Drawings

U.S. PATENT DOCUMENTS

| | | |
|---|---|---|
| 5,770,753 5,770,664 | 6/1998 | Okumura et al. |
| A | 6/1998 | Kuber et al. |
| 6,059,153 A * | 5/2000 | Olson et al. ............... 222/465.1 |
| 6,136,924 A | 10/2000 | Promel et al. |
| 6,187,866 B1 | 2/2001 | Jorgensen et al. |
| 6,248,831 B1 | 6/2001 | Maheshwari et al. |
| 6,407,185 B1 | 6/2002 | Promel et al. |
| 6,433,133 B1 * | 8/2002 | Coe ........................... 528/481 |
| 6,485,662 B1 | 11/2002 | Neubauer et al. |
| 6,511,935 B2 | 1/2003 | Job |
| 6,806,338 B2 | 10/2004 | Baann et al. |
| 2002/0034635 A1 * | 3/2002 | Terada et al. ................ 428/373 |
| 2003/0105198 A1 | 6/2003 | Plume et al. |
| 2003/0181608 A1 | 9/2003 | Baann et al. |

FOREIGN PATENT DOCUMENTS

| | | |
|---|---|---|
| EP | 0 485 822 A2 | 5/1992 |
| EP | 0 485 823 A1 | 5/1992 |
| EP | 0 518 092 A2 | 12/1992 |
| EP | 0 520 732 A1 | 12/1992 |
| EP | 0 591 756 A2 | 4/1994 |
| EP | 0 743 324 A2 | 11/1996 |
| EP | 1 357 136 A1 | 10/2003 |
| WO | WO-91/04257 | 4/1991 |
| WO | WO-92/00333 | 1/1992 |
| WO | WO-93/08199 | 4/1993 |
| WO | WO-93/08221 | 4/1993 |
| WO | WO-94/01471 | 1/1994 |
| WO | WO-96/20233 | 7/1996 |
| WO | WO-97/15582 | 5/1997 |
| WO | WO-97/19959 | 6/1997 |
| WO | WO-97/46567 | 12/1997 |
| WO | WO-98/01455 | 1/1998 |
| WO | WO-98/06759 | 2/1998 |
| WO | WO-98/11144 | 3/1998 |
| WO | WO-99/14271 | 3/1999 |
| WO | WO-2005/014680 A1 | 2/2005 |

OTHER PUBLICATIONS

Zimm, B.H., "Apparatus and Methods for Measurement and Interpretation of the Angular Variation of Light Scattering; Preliminary Results on Polystyrene Solutions", The Journal of Chemical Physics, 1948, pp. 1099-1116, vol. 16, No. 12, Department of Chemistry, California.

Randall, J.C., "Long-Chain Branching in Polyethylene", JMS-Rev. Macromol. Chem. Phys., 1989, pp. 285-297, vol. 29, Marcel Dekker, Inc.

Mourey, Thomas H. and Balke, Stephen T., A Strategy for Interpreting Multidetector Size-Exclusion Chromatography Data I, Chromatography of Polymers Characterization by SEC and FFF, 1993, Chpt. 12, pp. 180-198, Series 521, American Chemical Society.

Balke, Stephen T. et al., A Strategy for Interpreting Multidetector Size-Exclusion Chromatography Data II, Chromatography of Polymers Characterization by SEC and FFF, 1993, Chpt. 13, pp. 199-219, Series 521, American Chemical Society.

Kratochvil, P., Classical Light Scattering from Polymer Solutions, 1987, Chpts. 3 and 6, pp. 113-144 and 237-294, Elsevier, Oxford, New York.

* cited by examiner

HIGH-DENSITY POLYETHYLENE COMPOSITIONS AND METHOD OF MAKING THE SAME

FIELD OF INVENTION

The instant invention relates to high-density polyethylene compositions, and method of making the same.

BACKGROUND OF THE INVENTION

The use of polyethylene to form packaging materials is generally known. For example, polyethylene may be extruded to form films, or it may be fabricated into articles via molding techniques, e.g. injection molding. Examples of articles that may be manufactured by injection molding processes are containers, for food storage or non-food storage. Such food storage containers may, for example, be used for storage and packaging of ice cream and yogurt. Such containers should be of relatively uniform thickness and should have a surface that is acceptable to the consumer. Small containers tend to be of lower wall thickness than larger containers, as less flow of polymer is required during the injection molding process in order to fill the mold. Furthermore, such containers should have acceptable total energy absorbed on impact at very low temperatures, and to further have low brittleness temperatures.

U.S. Pat. No. 6,136,924 discloses a composition containing ethylene polymers comprising a polymer of melt index $MI_2$ of 5 to 1000 g/10 min and a polymer of melt index $MI_5$ of 0.01 to 2 g/10 min, the ratio of these indices being from 500 to 50,000 and the weight ratio of the two polymers being equal to (30 to 70):(70 to 30).

U.S. Pat. No. 6,407,185 discloses a process for the preparation of a composition containing ethylene polymers comprising a polymer of melt index $MI_2$ of 5 to 1000 g/10 min and a polymer of melt index $MI_5$ of 0.01 to 2 g/10 min, the ratio of these indices being from 500 to 50,000 and the weight ratio of the two polymers being equal to (30 to 70):(70 to 30), according to which part of the ethylene, a catalyst derived from a transition metal having an intrinsic molecular weight distribution defined by an intrinsic $M_w/M_n$ ratio less than or equal to 10 and a deactivation constant less than or equal to 0.5 $h^{-1}$, and a cocatalyst are introduced into a first reactor, polymerization of the ethylene is carried out therein, a mixture comprising one of the polymers, the catalyst and the cocatalyst is drawn off from this reactor and the mixture and another part of the ethylene are introduced into a second reactor, which ethylene is polymerized to form the other polymer.

U.S. Pat. No. 4,192,935 discloses an ethylene polymer having a density in the range of about 0.940-0.960, a melt index in the range 100-200 and a ratio of weight-average molecular weight to number-average molecular weight of less than 5. The polymer is a copolymer of ethylene and at least one α-olefin having 4-10 carbon atoms e.g. butene-1, hexene-1 or octene-1. The preferred polymer is a copolymer of ethylene and butene-1. The polymers may be used in the injection molding of thin-wall containers, e.g. containers having a wall thickness of less than 0.7 mm, especially a thickness of less than 0.5 mm, and in particular a thickness of less than 0.4 mm.

U.S. Pat. No. 4,294,794 discloses a process for producing an ethylene polymer having a density in the range of about 0.940-0.960, a melt index in the range 100-200 and a ratio of weight-average molecular weight to number-average molecular weight of less than 5.

U.S. Pat. No. 5,015,511 discloses improved injection-molded LLDPE articles. Improved injection-molded LLDPE articles have a wall thickness in the range of about 0.15 mm to as much as 1.5 mm, and they are prepared using an LLDPE containing a sufficient amount of at least one $C_5$-$C_{12}$ 1-alkene copolymerized with the ethylene to provide a density in the range of 0.91 to 0.945 g/cc, a melt flow rate in the range of 60 to 200 g/10 minutes, and an $I_{10}/I_2$ ratio of 7.2 to about 18.

U.S. Pat. No. 6,806,338 discloses an LLDPE produced using a single site catalyst, e.g., an LLDPE produced using a metallocene (m-LLDPE), which is preferably used in injection molding of food packaging material, especially closures for food containers exhibiting low levels of migration particularly suitable for use in packaging foods having a high fat content, typically less than 40 $mg/dm^2$, e.g., less than 5 $mg/dm^2$.

U.S. Patent Application Publication No. 2003/0105198 A1 discloses a polyethylene based composition comprising 0.05 to 0.5 wt. % of at least a saturated fatty acid amide containing 8 to 30 carbon atoms, 0 to 0.1 wt. % of an auxiliary lubricant selected among fatty acids, fatty acid esters, fatty acid salts, monounsaturated fatty acid amides, polyols containing at least 4 carbon atoms, monoalcohol or polyalcohol monoethers, glycerol esters, paraffins, polysiloxanes, fluorinated polymers and mixtures thereof, and 0 to 5 wt. % of one or more additives selected among the antioxidants, anti-acids, anti-UV stabilizers, coloring agents and antistatic agents.

U.S. Patent Application Publication No. 2003/0181608 A1 discloses the use of an LLDPE produced using a single site catalyst, e.g. an LLDPE produced using a metallocene (m-LLDPE), in injection molding of food packaging material, especially closures for food containers. Such materials have been found to exhibit low levels of migration, typically less than 40 $mg/dm^2$, e.g. less than 5 $mg/dm^2$, and are particularly suitable for use in packaging foods having a high fat content.

European Patent Application No. EP 1 357 136 A1 discloses single layer articles having improved dimensional stability produced by injection molding and consisting essentially of high-density polyethylene resins prepared with a bis-indenyl metallocene catalyst system.

International Publication No. WO 2005/014680 A1 discloses the use of a multimodal polyethylene composition as comonomers to ethylene at least two $C_{4-12}$ alpha-olefins in injection molding.

Despite the research efforts in developing polyethylene compositions suitable for injection molding, there is a still a need for a polyethylene composition having improved properties suitable for injection molding. Additionally, there is still a need for a process for producing a polyethylene composition having improved properties suitable for injection molding.

SUMMARY OF THE INVENTION

The instant invention is a high-density polyethylene composition, and method of making the same. The high-density polyethylene composition of the instant invention includes an ethylene alpha-olefin copolymer having a density in the range of 0.935 to 0.952 $g/cm^3$, a melt index ($I_2$) in the range of 30 to 75 g/10 minutes, an $I_{21}/I_2$ ratio in the range of 13-35, a $M_w/M_n$ ratio in the range of 3.5-8. The high-density polyethylene composition has brittleness temperature of at least less than −20° C. The process for producing a high-density polyethylene composition according to instant invention includes the following steps: (1) introducing ethylene, and an alpha-olefin comonomer into a reactor; (2) copolymerizing the ethylene with the alpha-olefin comonomer in the reactor; and (3) thereby producing the high-density polyethylene composition, wherein the high-density polyethylene composition having a density in the range of 0.935 to 0.952 g/cm³, a melt index ($I_2$) in the range of 30 to 75 g/10 minutes, an $I_{21}/I_2$ ratio in the range of 13-35, a $M_w/M_n$ ratio in the range of 3.5-8, and a brittleness temperature of at least less than −20° C.

DETAILED DESCRIPTION OF THE INVENTION

The high-density polyethylene composition of the instant invention includes an ethylene alpha-olefin copolymer having a density in the range of 0.935 to 0.952 g/cm³, a melt index ($I_2$) in the range of 30 to 75 g/10 minutes, an $I_{21}/I_2$ ratio in the range of 13-35, a $M_w/M_n$ ratio in the range of 3.5-8. The high-density polyethylene composition has a brittleness temperature of at least less than −20° C. The process for producing a high-density polyethylene composition according to instant invention includes the following steps: (1) introducing ethylene, and an alpha-olefin comonomer into a reactor; (2) copolymerizing the ethylene with the alpha-olefin comonomer in the reactor; and (3) thereby producing the high-density polyethylene composition, wherein the high-density polyethylene composition having a density in the range of 0.935 to 0.952 g/cm³, a melt index ($I_2$) in the range of 30 to 75 g/10 minutes, an $I_{21}/I_2$ ratio in the range of 13-35, a $M_w/M_n$ ratio in the range of 3.5-8, and a brittleness temperature of at least less than −20° C.

The high-density polyethylene composition may have any density; for example, the high-density polyethylene composition may have a density in the range of 0.935 to 0.952 g/cm³. All individual values and subranges from 0.935 to 0.952 g/cm³ are included herein and disclosed herein; for example, the high-density polyethylene composition may have a density in the range of 0.940 to 0.950 g/cm³, or in the alternative, the high-density polyethylene composition may have a density in the range of 0.945 to 0.950 g/cm³. The high-density polyethylene composition may further have any melt index ($I_2$); for example, the high-density polyethylene composition may have a melt index ($I_2$) in the range of 30 to 75 g/10 minutes. All individual values and subranges from 30 to 75 g/10 minutes are included herein and disclosed herein; for example, the high-density polyethylene composition may have a melt index ($I_2$) in the range of 40 to 55 g/10 minutes, or in the alternative, the high-density polyethylene composition may have a melt index ($I_2$) in the range of 45 to 55 g/10 minutes. The high-density polyethylene composition may further have any melt index ($I_{10}$); for example, the high-density polyethylene composition may have a melt index ($I_{10}$) in the range of 250 to 600 g/10 minutes. All individual values and subranges from 250 to 600 g/10 minutes are included herein and disclosed herein; for example, the high-density polyethylene composition may have a melt index ($I_{10}$) in the range of 250 to 600 g/10 minutes, or in the alternative, the high-density polyethylene composition may have a melt index ($I_{10}$) in the range of 300 to 575 g/10 minutes. The high-density polyethylene composition may further have any melt index ($I_{21}$); for example, the high-density polyethylene composition may have a melt index ($I_{21}$) in the range of 700 to 1800 g/10 minutes. All individual values and subranges from 700 to 1800 g/10 minutes are included herein and disclosed herein; for example, the high-density polyethylene composition may have a melt index ($I_{21}$) in the range of 750 to 1800 g/ 10 minutes, or in the alternative, the high-density polyethylene composition may have a melt index ($I_{21}$) in the range of 750 to 1700 g/10 minutes. The high-density polyethylene composition may further have any melt flow ration ($I_{21}/I_2$); for example, the high-density polyethylene composition may have a melt flow ration ($I_{21}/I_2$) in the range of 13 to 35. All individual values and subranges from 13 to 35 are included herein and disclosed herein; for example, the high-density polyethylene composition may have a melt flow ration ($I_{21}/I_2$) in the range of 15 to 35, or in the alternative, the high-density polyethylene composition may have a melt flow ration ($I_{21}/I_2$) in the range of 15 to 30. The high-density polyethylene composition may have any molecular weight distribution; for example, the high-density polyethylene composition may have a molecular weight distribution in the range of 3 to 10. All individual values and subranges from 3 to 10 are included herein and disclosed herein; for example, the high-density polyethylene composition may have a molecular weight distribution in the range of 3.5-8; or in the alternative, the high-density polyethylene composition may have a molecular weight distribution in the range of 3.5 to 7.8. The term molecular weight distribution or "MWD," as used herein, refers to the ratio of weight average molecular weight ($M_w$) to number average molecular weight ($M_n$), i.e. ($M_w/M_n$), described in further details herein below. The high-density polyethylene composition may have any environmental stress crack resistance. The high-density polyethylene composition may have any brittleness temperature; for example, the high-density polyethylene composition may preferably have a brittleness temperature of at least less than −20° C. All individual values and subranges less than −20° C. are included herein and disclosed herein. For example least less than about −45° C. or −50° C., or −55° C. Furthermore, the high-density polyethylene composition may have any IDI impact properties at −40° C.; for example, the high-density polyethylene composition may preferably have an IDI impact in peak energy of >26.5 inch lbs and in total energy of >31.5 inch lbs at −40° C.

The term "ethylene alpha-olefin copolymer" means copolymers of ethylene with one or more comonomers, and mixtures thereof. The comonomers are normally α-olefins containing 3 to 12 carbon atoms.

The ethylene alpha-olefin copolymer may preferably be a high-density polyethylene. The ethylene alpha-olefin copolymer may have any density; for example, the ethylene alpha-olefin copolymer may have a density in the range of 0.935 to 0.952 g/cm³. All individual values and subranges from 0.935 to 0.952 g/cm³ are included herein and disclosed herein; for example, the ethylene alpha-olefin copolymer may have a density in the range of 0.940 to 0.950 g/cm³, or in the alternative, the ethylene alpha-olefin copolymer may have a density in the range of 0.945 to 0.950 g/cm³. The ethylene alpha-olefin copolymer may further have any melt index ($I_2$); for example, the ethylene alpha-olefin copolymer may have a melt index ($I_2$) in the range of 30 to 75 g/10 minutes. All individual values and subranges from 30 to 75 g/10 minutes are included herein and disclosed herein; for example, the ethylene alpha-olefin copolymer may have a melt index ($I_2$) in the range of 40 to 55 g/10 minutes, or in the alternative, the ethylene alpha-olefin copolymer may have a melt index ($I_2$) in the range of 45 to 55 g/10 minutes. The ethylene alpha-olefin copolymer may further have any melt index ($I_{10}$); for example, the ethylene alpha-olefin copolymer may have a melt index ($I_{10}$) in the range of 250 to 600 g/10 minutes. All individual values and subranges from 250 to 600 g/10 minutes are included herein and disclosed herein; for example, the ethylene alpha-olefin copolymer may have a melt index ($I_{10}$) in the range of 250 to 600 g/10 minutes, or in the alternative, the ethylene alpha-olefin copolymer may have a melt index ($I_{10}$) in the range of 300 to 575 g/10 minutes. The ethylene alpha-olefin copolymer may further have any melt index ($I_{21}$); for example, the ethylene alpha-olefin copolymer may have a melt index ($I_{21}$) in the range of 700 to 1800 g/10 minutes. All individual values and subranges from 700 to 1800 g/10 minutes are included herein and disclosed herein; for example, the ethylene alpha-olefin copolymer may have a melt index ($I_{21}$) in the range of 750 to 1800 g/10 minutes, or in the alternative, the ethylene alpha-olefin copolymer may have a melt index ($I_{21}$) in the range of 750 to 1700 g/10 minutes. The ethylene alpha-olefin copolymer may further have any melt flow ration ($I_{21}/I_2$); for example, the ethylene alpha-olefin copolymer may have a melt flow ration ($I_{21}/I_2$) in the range of 13 to 35. All individual values and subranges from 13 to 35 are included herein and disclosed herein; for example, the ethylene alpha-olefin copolymer may have a melt flow ration ($I_{21}/I_2$) in the range of 15 to 35, or in the alternative, the ethylene alpha-olefin copolymer may have a melt flow ration ($I_{21}/I_2$) in the range of 15 to 30. The ethylene alpha-olefin copolymer may have any molecular weight distribution; for example, the ethylene alpha-olefin copolymer may have a molecular weight distribution in the range of 3 to 10. All individual values and subranges from 3 to 10 are included herein and disclosed herein; for example, the ethylene alpha-olefin copolymer may have a molecular weight distribution in the range of 3.5-8; or in the alternative, the ethylene alpha-olefin copolymer may have a molecular weight distribution in the range of 3.5 to 7.8. The term molecular weight distribution or "MWD," as used herein, refers to the ratio of weight average molecular weight ($M_w$) to number average molecular weight ($M_n$), i.e. ($M_w/M_n$), described in further details herein below. The ethylene alpha-olefin copolymer may have any environmental stress crack resistance.

The ethylene alpha-olefin copolymer may include any amount of one or more alpha-olefin copolymers; for example, the ethylene alpha-olefin copolymer may comprise about less than 10 percent by weight of one or more alpha-olefin comonomers, based on the weight of the ethylene alpha-olefin copolymer. All individual values and subranges less than 10 weight percent are included herein and disclosed herein. The ethylene alpha-olefin copolymer may include any amount of ethylene; for example, the ethylene alpha-olefin copolymer may comprise at least about 90 percent by weight of ethylene, based on the weight of the ethylene alpha-olefin copolymer. All individual values and subranges above 90 weight percent are included herein and disclosed herein.

The alpha-olefin comonomers typically have no more than 20 carbon atoms. For example, the alpha-olefin comonomers may preferably have 3 to 10 carbon atoms, and more preferably 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The alpha-olefin comonomers may preferably be selected from the group consisting of propylene, 1-butene, 1-hexene, and 1-octene, and more preferably from the group consisting of 1-hexene and 1-octene.

The high-density polyethylene composition may further include additional additives. Such additives include, but are not limited to, antistatic agents, color enhancers, dyes, lubricants, fillers, pigments, primary antioxidants, secondary antioxidants, processing aids, UV stabilizers, and combinations thereof. The high-density polyethylene composition may contain any amounts of additives. The high-density polyethylene composition may compromise from about 0 to about 1 percent by the combined weight of additives, based on the weight of the high-density polyethylene composition. All individual values and subranges from about 0 to about 1 weight percent are included herein and disclosed herein; for example, the high-density polyethylene composition may compromise from 0 to 0.5 percent by the combined weight of additives, based on the weight of the high-density polyethylene composition. Antioxidants, such as Irganox 1076 and Irganox 1010, are commonly used to protect the polymer from thermal and/or oxidative degradation. Irganox 1076 and Irganox 1010 are commercially available from Ciba Geigy Inc.

Different polymerization reactions and catalyst systems may be employed to produce the high-density polyethylene composition of the instant invention. Typical transition metal catalyst systems used to prepare the blend are magnesium/titanium based catalyst systems, exemplified by the catalyst system described in U.S. Pat. No. 4,302,565; vanadium based catalyst systems, such as those described in U.S. Pat. No. 4,508,842; U.S. Pat. No. 5,332,793; U.S. Pat. No. 5,342,907; and U.S. Pat. No. 5,410,003; and a metallocene catalyst system, such as those described in U.S. Pat. No. 4,937,299; U.S. Pat. No. 5,317,036; and U.S. Pat. No. 5,527,752. Catalyst systems that use molybdenum oxides on silica-alumina supports are also useful. Preferred catalyst systems for preparing the components for the blends of this invention are Ziegler-Natta catalyst systems and metallocene catalyst systems.

In some embodiments, preferred catalysts used in the process to make the compositions of the present invention are of the magnesium/titanium type. In particular, for the gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. No. 6,187,866 and U.S. Pat. No. 5,290,745, the relevant portions thereof being incorporated herein by reference. Precipitated/crystallized catalyst systems, such as those described in U.S. Pat. No. 6,511,935 and U.S. Pat. No. 6,248,831, the relevant portions thereof being incorporated herein by reference, may also be used. Such catalysts may further be modified with one precursor activator. Such further modifications are described in U.S. provisional applications 60/469,663 and 60/469,663, the relevant portions thereof being incorporated herein by reference.

Preferably the catalyst precursor has the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of 0° C. to 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains approximately 1 to approximately 20 moles of electron donor per mole of titanium compound and preferably approximately 1 to approximately 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and titanium compounds may be impregnated into a porous support and dried to form a solid catalyst; it is preferred that the solution be converted into a solid catalyst via spray drying. Each of these methods thus forms a "supported catalyst precursor."

The spray dried catalyst product is then preferentially placed into a mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump is typically used in commercial reaction systems, while a dual piston syringe pump is typically used in pilot scale reaction systems, where the catalyst flows are less than, or equal to, 10 cm$^3$/hour (2.78×10$^{-9}$ m$^3$/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483 may also be used.

The cocatalysts, which are reducing agents, conventionally used, are comprised of aluminum compounds, but compounds of lithium, sodium and potassium, alkaline earth metals, as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula AlR$_a$X$_b$H$_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms and the trialkylaluminums. Examples are diethylaluminum chloride and tri-n-hexylaluminum. About 0.10 to 10 moles, and preferably 0.15 to 2.5 moles, of activator are used per mole of electron donor. The molar ratio of activator to titanium is in the range from 1:1 to 10:1, and is preferably in the range from 2:1 to 5:1.

The hydrocarbyl aluminum cocatalyst can be represented by the formula R$_3$Al or R$_2$AlX, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silica/alumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of 10 to 250 µm and preferably 30 to 100 µm; a surface area of at least 200 m$^2$/g and preferably at least 250 m$^2$/g; and a pore size of at least 100×10$^{-10}$ m and preferably at least 200×10$^{-10}$ m. Generally, the amount of support used is that which will provide 0.1 to 1.0 millimole of titanium per gram of support and preferably 0.4 to 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

In another embodiment, metallocene catalysts, single-site catalysts and constrained geometry catalysts may be used in the practice of the invention. Generally, metallocene catalyst compounds include half and full sandwich compounds having one or more π-bonded ligands including cyclopentadienyl-type structures or other similar functioning structure such as pentadiene, cyclooctatetraendiyl and imides. Typical compounds are generally described as containing one or more ligands capable of π-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements.

Exemplary of metallocene-type catalyst compounds are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753 and 5,770,664; European publications: EP-A-0 591 756; EP-A-0 520 732; EP-A-0 420 436; EP-A-0 485 822; EP-A-0 485 823; EP-A-0 743 324; EP-A-0 518 092; and PCT publications: WO 91/04257; WO 92/00333; WO 93/08221; WO 93/08199; WO 94/01471; WO 96/20233; WO 97/15582; WO 97/19959; WO 97/46567; WO 98/01455; WO 98/06759 and WO 98/011144. All of these references are incorporated herein, in their entirety, by reference.

Suitable catalysts for use herein, preferably include constrained geometry catalysts as disclosed in U.S. Pat. Nos. 5,272,236 and 5,278,272, which are both incorporated in their entirety by reference.

The monocyclopentadienyl transition metal olefin polymerization catalysts taught in U.S. Pat. No. 5,026,798, the related portion of the teachings of which are incorporated herein by reference, are also suitable as catalysts of the invention.

The foregoing catalysts may be further described as comprising a metal coordination complex comprising a metal of groups 3-10 or the Lanthanide series of the Periodic Table of the Elements, and a delocalized π-bonded moiety, substituted with a constrain-inducing moiety. Such a complex has a constrained geometry about the metal atom. The catalyst further comprises an activating cocatalyst.

Any conventional ethylene homopolymerization or copolymerization reactions may be employed to produce the high-density polyethylene composition of the instant invention. Such conventional ethylene homopolymerization or copolymerization reactions include, but are not limited to, gas phase polymerization, slurry phase polymerization, liquid phase polymerization, and combinations thereof using conventional reactors, e.g. gas phase reactors, loop reactors, stirred tank reactors, and batch reactors. Preferably, gas phase polymerization using a single gas phase reactor is employed to produce the high-density polyethylene composition of the instant invention.

The instant application, for convenience, is further discussed with regard to gas phase polymerization utilizing a single gas phase reactor; however, the instant invention is not so limited, and other polymerization techniques, e.g. slurry phase polymerization, liquid phase polymerization, using other conventional reactors, e.g. loop reactors, stirred tank reactors, and batch reactors, may be employed.

In production, a catalyst system including a cocatalyst, ethylene, alpha-olefin, hydrogen, and optionally inert gases and/or liquids, e.g. $N_2$, isopentane, hexane, are continuously fed into a single gas phase reactor, and the final product, i.e. the high-density polyethylene composition, is continuously removed, for example, in batches from the gas phase reactor. The polymer may then be transferred to a purge bin under inert atmosphere conditions. Subsequently, the residual hydrocarbons are removed, and moisture may be introduced to reduce any residual aluminum alkyls and any residual catalysts before the polymer, i.e. the instant high-density polyethylene composition, is exposed to oxygen. The polymer may then be transferred to an extruder to be pelletized. Such pelletization techniques are generally known. The instant high-density polyethylene composition may further be melt screened. Subsequent to the melting process in the extruder, the molten composition is passed through one or more active screens (positioned in series of more than one) with each active screen having a micron retention size of from about 2 to about 400 (2 to $4 \times 10^{-5}$ m), and preferably about 2 to about 300 (2 to $3 \times 10^{-5}$ m), and most preferably about 2 to about 70 (2 to $7 \times 10^{-6}$ m), at a mass flux of about 5 to about 100 lb/hr/in² (1.0 to about 20 kg/s/m²). Such further melt screening is disclosed in U.S. Pat. No. 6,485,662, which is incorporated herein by reference to the extent that it discloses melt screening.

In application, the high-density polyethylene composition may be used to manufacture shaped articles. Such articles may include, but are not limited to, containers such as food containers and non-food containers. Food containers made from the high-density polyethylene of the instant invention may be used to store and package ice cream, and yogurt. Different methods may be employed to manufacture articles such containers, e.g. ice cream containers, ice cream tubs, and ice cream cups. An exemplary suitable conversion technique includes, but is not limited to, injection molding.

In general, injection molding is essentially a three-step process. In the first step, the polymer is heated, and mixed into a homogenous viscous liquid. In the second step, the molten polymer is forced, or injected, into a relatively cool mold. The third step is the cooling and subsequent ejection of the finished part from the mold.

Containers, e.g. food containers, including the high-density polyethylene composition of the instant invention exhibit improved brittleness temperature, improved total energy absorbed on impact at very low temperatures, e.g. less than −20° C., and exceptional gloss, as shown below.

Test Methods

Test methods include the following:

Density was measured according to ASTM D 792-03, Method B, in isopropanol.

Melt index ($I_2$) was measured at 190° C. under a load of 2.16 kg according to ASTM D-1238-03.

Melt index ($I_{10}$) was measured at 190° C. under a load of 10.0 kg according to ASTM D-1238-03.

Melt index ($I_{21}$) was measured at 190° C. under a load of 21.6 kg according to ASTM D-1238-03.

Weight average molecular weight ($M_w$) and number average molecular weight ($M_n$) were determined according to methods known in the art using conventional GPC, as described herein below.

The molecular weight distributions of ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 µm columns and one Shodex HT803M 150 mm, 12 µm column. The solvent used was 1,2,4 trichlorobenzene. The samples were prepared at a concentration of 0.1 grams of polymer in 50 milliliters of solvent. The chromatographic solvent and the sample preparation solvent contained 200 µg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.*, 6, 621 (1968)):

$$M{\rm polyethylene} = A \times (M{\rm polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatopraphy Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$a)\ \overline{Mn} = \frac{\sum_i Wf_i}{\sum_i (Wf_i / M_i)} \quad (2)$$

$$b)\ \overline{Mw} = \frac{\sum_i (Wf_i * M_i)}{\sum_i Wf_i}$$

$$c)\ \overline{Mz} = \frac{\sum_i (Wf_i * M_i^2)}{\sum_i (Wf_i * M_i)}$$

In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

Resin stiffness was characterized by measuring the Flexural Modulus at 5 percent strain and Secant Modulii at 1 percent and 2 percent strain, and a test speed of 0.5 inch/min (13 mm/min) per ASTM D 790-99 Method B.

Tensile strength at yield and elongation at break were measured according to ASTM D-638-03 employing Type IV Specimen.

Short chain branching distribution and comonomer content was measured using C13 NMR, as discussed in Randall, Rev. Macromol. Chem. Chys., C29 (2&3), pp. 285-297, and in U.S. Pat. No. 5,292,845, the disclosures of which are incorporated herein by reference to the extent related to such measurement. The samples were prepared by adding approximately 3 g of a 50/50 mixture of tetrachloroethane-d2/orthodichlorobenzene that was 0.025M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13C resonance frequency of 100.6 MHz. Acquisition parameters were selected to ensure quantitative 13C data acquisition in the presence of the relaxation agent. The data was acquired using gated 1H decoupling, 4000 transients per data file, a 4.7 sec relaxation delay and 1.3 sec acquisition time, a spectral width of 24,200 Hz and a file size of 64K data points, with the probe head heated to 130° C. The spectra were referenced to the methylene peak at 30 ppm. The results were calculated using ASTM method D5017-91.

The resin rheology was measured via capillary rheology. Capillary rheology measurements were carried out at 190° C. on a piston driven capillary rheometer (Rheograph 2003, Goettfert), equipped with a 12 mm barrel and a capillary die with flat entrance angle of length 20 mm and inner diameter 1 mm. A pressure transducer rated to 1000 bars was used. The polymer pellets were packed in the barrel of the capillary, and allowed to melt for 4 min before the test started. The piston speed was varied to achieve apparent shear rates in the range of 100 to 10,000 l/s (5 points per decade of shear rate). At each speed, the stress was determined when the steady-state of the pressure was reached.

Dart impact properties were measured according to a modified dart impact test, as outlined in the ASTM standard D 1709, which is based on a free-falling dart, and depending on the resistance to failure of the film, sample test specifications ASTM D 1709 Dart A or Dart B are followed. The Dart A and Dart B test methods use the same dart configuration and drop height, but dart weight is changed to yield a 50% of failure of the film based on 20~25 test specimens. The dart impact test is useful for quality control of films, but does not provide any quantitative dart property information. The instrumented dart impact (IDI) test was developed to quantifiably evaluate the dart impact performance of polymeric compression molded plaque and blown film samples. Additionally, this test provides insight to further understand the mechanism and characteristic of the dart properties of thin films. An ASTM standard has been released for this testing method, ASTM standard D7192. The dart impact test employed in the instant invention followed the same test protocol as ASTM standard D7192 with the exception of a slightly modified sample test radius. The IDI tests were performed on a modified MTS hydraulic universal mechanical tester. The impact dart was located on the top of the chamber, and the sample was clamped into the fixture at the bottom of the chamber and driven into the impart dart at a rate of 8000 in/min (3.4 m/s). Because the sample was driven by a hydraulically controlled piston the loading rate was constant throughout the duration of the test. The test can be conducted at various temperatures. For free-falling dart tests, like ASTM D 1709, the loading rate slowed due to the resistance of the sample during impact and failure. The specimens tested were on compression molded plaques of 40 mils in thickness (0.040 inches) and were made in accordance with ASTM D-1928 procedure C.

Antioxidant determination was obtained according to the following. Low or high molecular weight polyethylene was grounded into a powder. Five grams was extracted in 40 mls of CS2. The CS2 was then scanned by infrared and the level of I-1076 was determined. Often the I-1076 level must be determined by HPLC because of interferences from other additives.

The HPLC instrument was a HP 1090
The LC column was a Thermo Hypersil from Keystone Scientific.
The packing was Waters Spherisorb ODS 2
Column size was 150×4.6 mm.
Pore size was 80 A
Particle size was 3 μm.
Initial solvent was 30% water, 70% Acetonitrile;
10 minutes 100% Acetonitrile;
15 minutes 80% Acetonitrile, 20% Isopropanol;
Total run time was 20 minutes;
Flow rate was 1 ml per minute;
Wavelength appropriate to I-1076 was monitored;
injection size was 5 μl;
Calibration for each additive was performed by making up a known concentration in isopropanol.

EXAMPLES

The following three examples illustrate exemplary embodiments of the present invention, but are not intended to limit the scope of the invention.

Examples 1-4 were prepared according to the following procedures: a single gas phase polymerization system, e.g. a single gas phase reactor, was provided. Ethylene, alpha-olefin comonomers, hydrogen, cocatalyst, e.g. TEAL, catalyst, e.g. Ziegler-Natta catalyst, slurried in mineral oil, $N_2$, and isopentane were fed continuously into the gas phase reactor. The single gas phase polymerization reaction was carried out in the single gas phase reactor under the following conditions: reaction temperatures between 80 to 105° C., $H_2/C_2$ ratio in the range of 0.4 to 1.0, $C_2$ partial pressures in the range of 75-250 psi, $C_6/C_2$ ratios in the range of 0.02 to 0.10 in the reactor thereby producing the ethylene alpha-olefin copolymer. Subsequently, the ethylene alpha-olefin copolymer was continuously removed from the gas phase reactor in batches into the product chamber, where it was purged to remove residual hydrocarbons, and then transferred to a fiberpak drum. The fiberpak drum was continuously purged with humidified nitrogen. The polymer, i.e. the instant high-density polyethylene composition, was further processed in a mixer/pelletizer. Additional additives, as shown in Table I, were added to the polymer, i.e. the instant high-density polyethylene composition. The polymer, i.e. the instant high-density polyethylene composition, was melted in the mixer, and additives were distributed in the polymer matrix. The polymer was extruded through a die plate, pelletized, and cooled. The average particle size measured was in the range of 0.015 to 0.035 inches with a bulk density in the range of 18 to 28 pounds per cubic foot. The titanium productivity was in the range of 500,000 to 3,000,000 pounds per pound. The resins of Examples 1-4, and Comparative Examples A-C were further tested for their properties, and such properties are shown in Table I, and Table II, respectively. Additionally, the resins of Examples 1-4 and Comparative Examples A-C were tested via capillary rheology, and the results are shown in Table III.

The present invention may be embodied in other forms without departing from the spirit and the essential attributes thereof, and, accordingly, reference should be made to the appended claims, rather than to the foregoing specification, as indicating the scope of the invention.

TABLE I

| | Test Method | Example 1 | Example 2 | Example 3 | Example 4 |
| --- | --- | --- | --- | --- | --- |
| MI2 g/10 min | ASTM D-1238 | 48.4 | 71.0 | 45.2 | 66.5 |
| MI10 g/10 min | ASTM D-1238 | 331.0 | 555.0 | 327.0 | 516.0 |
| MI21 g/10 min | ASTM D-1238 | 846 | 1536 | 868 | 1253 |
| MFR (MI10/MI2) | | 7 | 8 | 7 | 8 |
| MFR (MI21/MI2) | | 17 | 22 | 19 | 19 |
| MFR (MI5/MI2) | | | | | |
| Density (g/10 min) | ASTM D-792 | 0.9419 | 0.9458 | 0.9468 | 0.9422 |
| Density (g/10 min) Repeat | ASTM D-792 | 0.9425 | 0.9468 | 0.9473 | 0.9425 |

TABLE I-continued

|  | Dow Method | Example 1 | Example 2 | Example 3 | Example 4 |
|---|---|---|---|---|---|
| IR structure |  |  |  |  |  |
| Trans/1000 carbons |  | 0.004 | 0.001 | 0 | 0.001 |
| Vinyls/1000 carbons |  | 0.106 | 0.095 | 0.121 | 0.1 |
| Methyls/1000 carbons |  | 8 | 7 | 5 | 9 |
| DSC results | ASTM D 3418 |  |  |  |  |
| Melting point (° C.) |  | 126.48 | 127.11 | 127.49 | 126.5 |
| Heat of fusion (J/g) |  | 189.3 | 195.7 | 195.4 | 186 |
| Crystallization point (° C.) |  | 115.13 | 116.03 | 116.35 | 115.16 |
| Heat of fusion (J/g) |  | 192 | 197.7 | 199 | 190 |
| Comments |  | Nice sharp peaks | Nice Sharp peaks | Nice Sharp peaks | Nice Sharp peaks |
| C13 NMR results | ASTM D-5017-91 |  |  |  |  |
| Wt % Hexene |  | 4.7 | 4 | 3.8 | 4.9 |
| Atref Results |  |  |  |  |  |
| High Density Fraction (%) |  | 53.1 | 57.1 | 61.8 | 55.2 |
| Temp Min (° C.) |  | 86.4 | 86.1 | 86 | 86 |
| Purge (%) |  | 13.5 | 14.1 | 13.9 | 17.2 |
| SCB % |  | 33.4 | 28.8 | 24.3 | 27.6 |
| Mv Ave |  | 27,286 | 25,161 | 28,785 | 25,532 |
| SCB Mv |  | 28,678 | 26,400 | 29,924 | 27,153 |
| Purge Mv |  | 18,367 | 17,615 | 21,730 | 17,729 |
| HD Peak Temp (° C.) |  | 99 | 99 | 99 | 99 |
| GPC Data |  |  |  |  |  |
| Conventional GPC (Refractometer and Viscometer data only) |  |  |  |  |  |
| Mn |  | 10220 | 10010 | 11100 | 9890 |
| Mw |  | 45440 | 38140 | 42000 | 37730 |
| Mz |  | 177700 | 101600 | 101600 | 94200 |
| Mw/Mn |  | 4.4 | 3.8 | 3.8 | 3.8 |
| Absolute GPC (RI, V and LS data) |  |  |  |  |  |
| Mn |  | 10492 | 10325 | 11253 | 10135 |
| Mw |  | 74140 | 73200 | 81830 | 69810 |
| Mw/Mn |  | 7.1 | 7.1 | 7.3 | 6.9 |
| Mz(BB) |  | 488300 | 513300 | 509400 | 487700 |
| Mz (abs) |  | 3519000 | 3396000 | 3492000 | 2367000 |
| Mz + 1 (BB) |  | 1066900 | 1078700 | 1056900 | 1053000 |
| Mz/Mw |  | 47.5 | 46.4 | 42.7 | 33.9 |
| Antioxidant Analysis |  |  |  |  |  |
| Irganox 1076 (ppm) |  | 182 | 189 | 187 | 181 |
| Capillary Rheometer |  |  |  |  |  |
| Brittle Point - Temp at 50% breaks (° C.) | ASTM D-746 | −52.8 | >−20 | −68.3 | −38.7 |
| Tensile and Modulus Data (Numbers after +/− represent the standard deviation. |  |  |  |  |  |
| Tensile Yield (psi) Type IV @ 2"/min | ASTM D-638 | 3030 +/− 32.7 | 3238 +/− 57.8 | 3372 +/− 25.6 | 3074 +/− 29.6 |
| Tensile Yield (psi) Type IV @ 2"/min | ASTM D-638 | 3030 | 3238 | 3372 | 3074 |
| % Elongation @ yield | ASTM D-638 | 9.05 +/− 0.4 | 8.34 +/− 0.24 | 8.26 +/− 0.19 | 8.55 +/− 0.22 |
| Tensile Strength (psi) | ASTM D-638 | 2087 +/− 749 | 3173 +/− 65.2 | 3169 +/− 210 | 3024 +/− 35.3 |
| % Elongation @ Break | ASTM D-638 | 36.6 +/− 27.2 | 10.7 +/− 1.06 | 12.3 +/− 2.34 | 11.0 +/− 0.7 |
| Secant Modulus 1% (psi) | ASTM D-790 | 109200 | 123500 | 122300 | 110800 |
| Secant Modulus 2% (psi) | ASTM D-790 | 83500 | 94200 | 93000 | 84400 |
| Flexural Modulus @ 5% (psi) | ASTM D-790 | — | 106000 | 115250 | 95500 |
| IDI Data at −40 F. |  |  |  |  |  |
| Peak Load | lbs. | 198 | 206 | 210 | 210 |
| Peak Energy | inch-lbs. | 28.5 | 28.3 | 28.5 | 31.4 |
| Total Energy | inch-lbs. | 33.5 | 33.5 | 38.6 | 36.3 |
| Failure Mode | ductile or brittle | 5d | 5d | 5d | 5d |

TABLE II

| | Test Method | Comparative A | Comparative B | Comparative C |
|---|---|---|---|---|
| MI2 g/10 min | ASTM D-1238 | 46.4 | 55.8 | 41.7 |
| MI10 g/10 min | ASTM D-1238 | 354.0 | 418.0 | 464.0 |
| MI21 g/10 min | ASTM D-1238 | 978 | 951 | 1161 |
| MFR (MI10/MI2) | | 8 | 7 | 11 |
| MFR (MI21/MI2) | | 21 | 17 | 28 |
| MFR (MI5/MI2) | | | | |
| Density (g/10 min) | ASTM D-792 Dow Method | 0.9418 | 0.9517 | 0.9474 |
| IR structure | | | | |
| Trans/1000 carbons | | 0.149 | 0.086 | 0.007 |
| Vinyls/1000 carbons | | 0.825 | 0.86 | 0.614 |
| Methyls/1000 carbons | | 7 | 3 | 0.6 |
| DSC results | ASTM D 3418 | | | |
| Melting point (° C.) | | 127.14 | 124.16 | 126.18 |
| Heat of fusion (J/g) | | 204.3 | 184.3 | 197.4 |
| Crystallization point (° C.) | | 114.94 | 111.1 | 113.16 |
| Heat of fusion (J/g) | | 213.8 | 193.7 | 200.3 |
| Comments | | Nice Sharp peaks | Nice Sharp peaks | Nice Sharp peaks |
| C13 NMR results | ASTM D-5017-91 | | | |
| Wt % Hexene | | | | 2.6 |
| Wt % Butene | | 2.7 | 1.4 | |
| Atref Results | | | | |
| High Density Fraction (%) | | 63 | 80.5 | 76.8 |
| Temp Min (° C.) | | 86.1 | 86 | 86 |
| Purge (%) | | 9.3 | 9 | 4.8 |
| SCB % | | 27.7 | 10.5 | 18.4 |
| Mv Ave | | 28,523 | 26,414 | 34,029 |
| SCB Mv | | 28,984 | 26,820 | 34,129 |
| Purge Mv | | 24,026 | 22,223 | 32,049 |
| HD Peak Temp (° C.) | | 96 | 96 | 98 |
| GPC Data | | | | |
| Conventional GPC (Refractometer and Viscometer data only) | | | | |
| Mn | | 11410 | 12960 | 9990 |
| Mw | | 43200 | 46810 | 50530 |
| Mz | | 116600 | 130300 | 270000 |
| Mw/Mn | | 3.8 | 3.6 | 5.1 |
| Absolute GPC (RI, V and LS data) | | | | |
| Mn | | 11,304 | 12,606 | 9,679 |
| Mw | | 42,270 | 44,950 | 49,210 |
| Mw/Mn | | 3.7 | 3.6 | 5.1 |
| Mz(BB) | | 158,800 | 153,800 | 312,000 |
| Mz (abs) | | 198,900 | 139,800 | 268,300 |
| Mz + 1 (BB) | | 552,500 | 464,600 | 1,019,000 |
| Mz/Mw | | 4.7 | 3.1 | 5.5 |
| Antioxidant Analysis | | | | |
| Irganox 1076 (ppm) | | 194 | 173 | 429 |
| Capillary Rheometer | | | | |
| Brittle Point - Temp at 50% breaks (° C.) | ASTM D-746 | −42.5 | >−20 | >−20 |
| Tensile and Modulus Data (Numbers after +/− represent the standard deviation. | | | | |
| Tensile Yield (psi) Type IV @ 2"/min | ASTM D-638 | 2103 +/− 87 | 2434 +/− 120 | 2340 +/− 145 |
| Tensile Yield (psi) Type IV @ 2"/min | ASTM D-638 | 2103 | 2434 | 2340 |
| % Elongation @ yield | ASTM D-638 | 2.1 | 1.7 +/− 0.36 | 1.85 +/− 0.2 |
| Tensile Strength (psi) | ASTM D-638 | 2910 +/− 70 | 3882 +/− 37 | 3395 +/− 100 |
| % Elongation @ Break | ASTM D-638 | 19 +/− 7 | 12 +/− 2 | 16 =/− 2 |
| Secant Modulus 1% (psi) | ASTM D-790 | 102,800 | 141,600 | 119,700 |
| Secant Modulus 2% (psi) | ASTM D-790 | 77,100 | 105,400 | 91,000 |
| Flexural Modulus @ 5% (psi) | ASTM D-790 | 88,200 | 109,200 | 98,400 |
| IDI Data at −40 F. | | | | |
| Peak Load | lbs. | 179 | | 176 |
| Peak Energy | inch-lbs. | 25.8 | | 23.5 |
| Total Energy | inch-lbs. | 30.7 | | 25.7 |
| Failure Mode | ductile or brittle | 5d | | 5b |

TABLE III

| | Apparent viscosity data (Pa · s) (without Rabinovich correction) | | | | | | |
|---|---|---|---|---|---|---|---|
| Shear Rate (1/s) | Example 1 | Example 2 | Example 3 | Example 4 | Comparative A | Comparative B | Comparative C |
| GAMMA | ETA Apparent | ETA Apparent | ETA Apparent | ETA Apparent | ETA Apparent | ETA Apparent | ETA Apparent |
| 99.9936 | | 97.7102 | 152.672 | 103.817 | 146.565 | 140.458 | 158.779 |
| 158.054 | 146.815 | 96.5885 | 142.951 | 104.316 | 142.951 | 127.497 | 139.087 |
| 249.984 | 127.023 | 90.3819 | 134.352 | 97.7102 | 129.466 | 119.695 | 124.581 |
| 399.974 | 111.451 | 83.9697 | 119.084 | 88.5499 | 117.558 | 108.397 | 105.344 |
| 630.029 | 98.8626 | 75.6008 | 104.678 | 80.447 | 104.678 | 96.9241 | 91.1087 |
| 1000.05 | 84.876 | 65.9468 | 89.7609 | 70.2211 | 90.9822 | 86.0972 | 76.3273 |
| 1500.02 | 73.277 | 57.8074 | 76.9409 | 61.0642 | 78.9764 | 75.3125 | 64.3209 |
| 2499.96 | 58.8677 | 47.3873 | 61.3103 | 49.5857 | 63.9972 | 62.0431 | 51.784 |
| 3999.97 | 46.715 | 38.4712 | 49.005 | 40.1505 | 51.2949 | 49.6156 | 41.3718 |

We claim:

1. A high-density polyethylene composition comprising:
   an ethylene alpha-olefin copolymer consisting essentially of the copolymerization product of ethylene and one or more alpha-olefins having a density in the range of 0.935 to 0.952 g/cm$^3$, a melt index ($I_2$) in the range of 30 to 75 g/10 minutes, an $I_{21}/I_2$ ratio in the range of 13-35, a $M_w/M_n$ ratio in the range of 3.5-8;
   wherein said high-density polyethylene composition has a brittleness temperature of at least less than −20° C.

2. The high-density polyethylene composition according to claim 1, wherein said high-density polyethylene composition has a brittleness temperature of at least less than −45° C.

3. The high-density polyethylene composition according to claim 1, wherein said high-density polyethylene composition has an IDI impact in peak energy of >26.5 inch lbs and in total energy of >31.5 inch lbs at −40° C.

4. The high-density polyethylene composition according to claim 1, wherein said high-density polyethylene composition provides an improved total energy absorbed on impact at a temperature of at least less than −20° C.

5. An article comprising:
   a high-density polyethylene composition comprising;
      an ethylene alpha-olefin copolymer essentially consisting of the copolymerization product of ethylene and one or more alpha-olefins has a density in the range of 0.935 to 0.952 g/cm$^3$, a melt index ($I_2$) in the range of 30 to 75 g/10 minutes, an $I_{21/I2}$ ratio in the range of 13-35, a $M_w/M_n$ ratio in the range of 3.5-8;
   wherein said high-density polyethylene composition has a brittleness temperature of at least less than −20° C.

6. The article according to claim 5, wherein said article is an injection molded article.

7. The article according to claim 6, wherein said injection molded article is used as a food container or a non-food container.

8. A process for making an article comprising the steps of:
   providing a high-density polyethylene composition comprising an ethylene alpha-olefin copolymer essentially consisting of the copolymerization product of ethylene and one or more alpha-olefins having a density in the range of 0.935 to 0.952 g/cm$^3$, a melt index ($I_2$) in the range of 30 to 75 g/10 minutes, an $I_{21}/I_2$ ratio in the range of 13-35, a $M_w/M_n$ ratio in the range of 3.5-8, and wherein said high-density polyethylene composition has a brittleness temperature of at least less than −20° C.;
   injection molding said high-density polyethylene composition into said article.

9. The process for making an article according to claim 8, wherein said high-density polyethylene composition has a brittleness temperature of at least less than −45° C.

10. The process for making an article according to claim 8, wherein said high-density polyethylene composition provides an improved total energy absorbed on impact at a temperature of at least less than −20° C.

11. The process for making an article according to claim 8, wherein said high-density polyethylene composition provides an IDI impact in peak energy of >26.5 inch lbs and in total energy of >31.5 inch lbs at −40° C.

* * * * *